US007491928B2

(12) United States Patent
Roichman et al.

(10) Patent No.: US 7,491,928 B2
(45) Date of Patent: Feb. 17, 2009

(54) EXTENDED OPTICAL TRAPS BY SHAPE-PHASE HOLOGRAPHY

(75) Inventors: Yohai Roichman, New York, NY (US); David G. Grier, New York, NY (US); Ilias Cholis, New York, NY (US)

(73) Assignee: New York University, New York, NY (US)

( * ) Notice: Subject to any disclaimer, the term of this patent is extended or adjusted under 35 U.S.C. 154(b) by 263 days.

(21) Appl. No.: 11/633,178

(22) Filed: Dec. 4, 2006

(65) Prior Publication Data
US 2007/0139784 A1 Jun. 21, 2007

Related U.S. Application Data

(60) Provisional application No. 60/852,252, filed on Oct. 17, 2006, provisional application No. 60/777,622, filed on Feb. 28, 2006, provisional application No. 60/742,444, filed on Dec. 5, 2005.

(51) Int. Cl.
*H01S 1/00* (2006.01)
*G02B 27/00* (2006.01)

(52) U.S. Cl. .................. 250/251; 250/216; 250/574; 359/641; 359/558

(58) Field of Classification Search .......... 250/251, 250/216, 574, 227.11; 359/641, 558
See application file for complete search history.

(56) References Cited

U.S. PATENT DOCUMENTS

| 6,055,106 | A | 4/2000 | Grier et al. | |
|---|---|---|---|---|
| 6,858,833 | B2 * | 2/2005 | Curtis et al. | 250/221 |
| 7,109,473 | B2 * | 9/2006 | Grier et al. | 250/251 |
| 7,232,989 | B2 * | 6/2007 | Grier et al. | 250/251 |

OTHER PUBLICATIONS

Agarwal, R., et al., "Manipulation and Assembly of Nanowires with Holographic Optical Traps," *Optics Express*, Oct. 2005, vol. 13, No. 22, pp. 8906-8912.

Arlt, J., et al., "Optical Micromanipulation Using a Bessel Light Beam," *Optics Communication*, Oct. 2001, vol. 197, pp. 239-245.

Ashkin, A., et al., "Observation of a Single-Beam Gradient Force Optical Trap for Dielectric Particles," *Optics Letters*, May 1986, vol. 11, No. 5, pp. 288-290.

Biancaniello, P.L., "Colloidal Interactions and Self-Assembly Using DNA Hybridization," *Physical Review Letters*, Feb. 2005, vol. 94, pp. 058302-1-058302-4.

Chiou, A. E., et al., "Interferometric Optical Tweezers," *Optics Communication*, Jan. 1997, vol. 133, pp. 7-10.

Crocker, J. C., et al., "Microscoptic Measurement of the Pair Interaction Potential of Charge-Stabilized Colloid," *Physical Review Letters*, Jul. 1994, vol. 73, No. 2, pp. 352-355.

(Continued)

*Primary Examiner*—Nikita Wells
(74) *Attorney, Agent, or Firm*—Foley & Lardner LLP

(57) ABSTRACT

A method and system for establishing extended optical traps for commercial use. The method and system employs a diffractive optical element (DOE) to process a light beam wherein the DOE includes phase information and amplitude information to create the extended optical trap. Such extended traps can be line traps and can be further expanded to two and three dimensional configurations.

24 Claims, 5 Drawing Sheets

OTHER PUBLICATIONS

Crocker, J. C., et al., "Methods of Digital Video Microscopy for Colloidal Studies," *Journal of Colloid and Interface Science*, 1996, vol. 179, pp. 298-310.

Crocker, J. C., et al., "Entropic Attraction and Repulsion in Binary Colloids Probed with a Line Optical Tweezer," *Physical Review Letters*, May 1999, vol. 82, No. 21, pp. 4352-4355.

Curtis, J. E., et al., "Dynamic Holographic Optical Tweezers," *Optics Communication*, Jun. 2002, vol. 207, pp. 169-175.

Curtis, J. E., et al., "Structure of Optical Vortices," *Physical Review Letters*, Apr. 2003, vol. 90, No. 13, pp. 133901-1-133901-4.

Curtis, J. E., et al., "Modulated Optical Vortices," *Optics Letters*, Jun. 2003, vol. 28, No. 11, pp. 872-874.

Dufresne, E. R., " Optical Tweezer Arrays and Optical Substrates Created with Diffractive Optics," *Review of Scientific Instruments*, May 1998, vol. 69, No. 5, pp. 1974-1977.

Eriksen, R. L., et al., "Fully Dynamic Multiple-Beam Optical Tweezers," *Optics Express*, Jul. 2002, vol. 10, No. 14, pp. 597-602.

Faucheux, L. P., et al., "Optical Thermal Ratchet," *Physical Review Letters*, Feb. 1995, vol. 74, No. 9, pp. 1504-1507.

Faucheux, L. P., et al., "Periodic Forcing of a Brownian Particle," *Physical Review E*, Jun. 1995, vol. 51, No. 6, pp. 5239-5250.

Gahagan, K. T., et al., "Optical Vortex Trapping of Particles," *Optics Letters*, Jun. 1996, vol. 21, No. 11, pp. 827-829.

Grier, David G., "A Revolution in Optical Manipulation," *Nature*, Aug. 2003, vol. 424, pp. 810-816.

He, H., et al., "Optical Particle Trapping with Higher-Order Doughnut Beams Produced Using High Efficiency Computer Generated Holograms," *Journal of Modern Optics*, 1995, vol. 42, No. 1, pp. 217-223.

Jerri, A. J., "The Gibbs Phenomenon in Fourier Analysis, Splines and Wavelet Approximations," *Kluwer Academic Publishers*, 1998, pp. vii-ix.

Ladavac, K., et al., "Sorting Mesoscopic Objects with Periodic Potential Landscapes: Optical Fractionation," *Physical Review E*, 2004, vol. 70, pp. 010901-1-010901-4.

Lee, S-H., et al., "Robustness of Holographic Optical Traps Against Phase Scaling Errors," *Optics Express*,, Sep. 2005, vol. 13, No. 19, pp. 7458-7465.

Liesener, J., et al., "Multi-Functional Optical Tweezers Using Computer-Generated Holograms," *Optics Communications*, Nov. 2000, vol. 185, pp. 77-82.

Moh, K. J., et al., "Multiple Optical Line Traps Using a Single Phase-Only Rectagular Ridge," *Appl. Phys. B*, 2005, vol. 80, pp. 973-976.

Pelton, M., et al., "Transport and Fractionation in Periodic Potential-Energy Landscapes," *Physical Review E*, 2004, vol. 70, pp. 031108-1-031108-10.

Polin, M., et al., "Optimized Holographic Optical Traps," *Optics Express*, Jul. 2005, vol. 13, No. 15, pp. 5831-5845.

Rodrigo, P. J., et al., "Four-Dimensional Optical Manipulation of Colloidal Particles,", *Applied Physics Letters*, 2005, vol. 86, pp. 074103-1-074103-3.

Roichman, Y., et al., "Holographic Assembly of Quasicrystalline Photonic Heterostructures," *Optics Express*, Jul. 2005, vol. 13, No. 14, pp. 5434-5439.

Roichman, Y., et al., "Optical Traps with Geometric Aberrations," *Applied Optics*, May 2006, vol. 45, No. 15, pp. 3425-3429.

Roichman, Y., et al., "Projecting Extended Optical Traps with Shape-Phase Holography," *Optics Letters*, Jun. 2006, vol. 31, No. 11, pp. 1675-1677.

Sasaki, K., et al., "Pattern Formation and Flow Control of Fine Particles by Laser-Scanning Micromanipulation," *Optics Letters*, Oct. 1991, vol. 16, No. 19, pp. 1463-1465.

Schonbrun, E., et al., "3D Interferometric Optical Tweezers using a Single Spatial Light Modulator," *Optics Express*, May 2005, vol. 13, No. 10, pp. 3777-3786.

Simpson, N. B., "Optical Tweezers and Optical Spanners with Laguerre-Gaussian Modes," *Journal of Modern Optics*, 1996, vol. 43, No. 12, pp. 2485-2491.

Verma, R., et al., "Entropic Colloidal Interactions in Concentrated DNA Solutions," *Physical Review Letters*, Nov. 1998, vol. 81, No. 18, pp. 4004-4007.

Verma, R., et al., "Attractions Between Hard Colloidal Spheres in Semiflexible Polymer Solutions," *Macromolecules*, 2002, vol. 33, pp. 177-186.

Yu, T., et al., "The Manipulation and Assembly of CuO Nanorods with Line Optical Tweezers," *Nanotechnology*, 2004, vol. 15, pp. 1732-1736.

\* cited by examiner

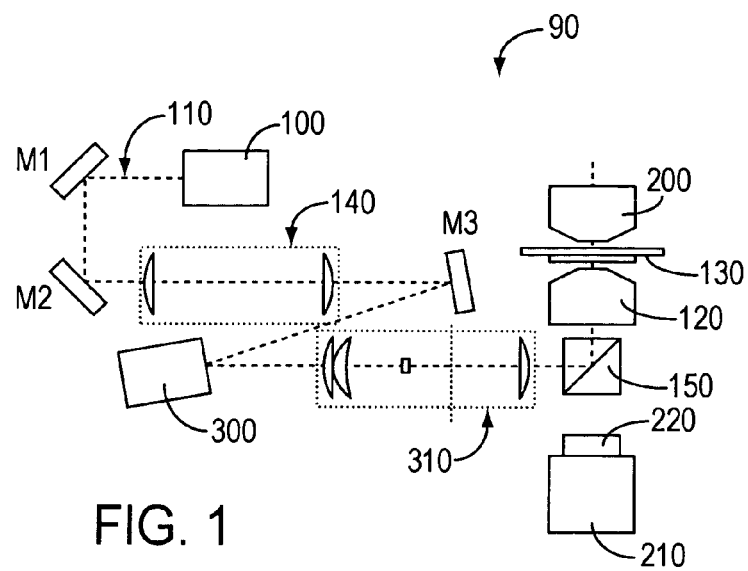
FIG. 1
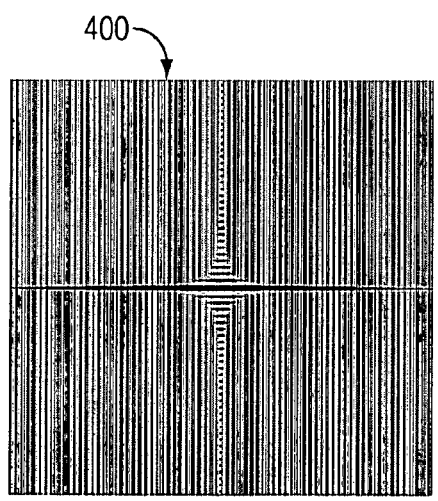
FIG. 2
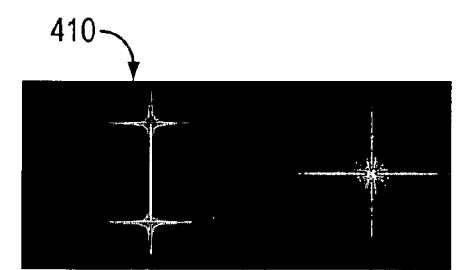
FIG. 3A
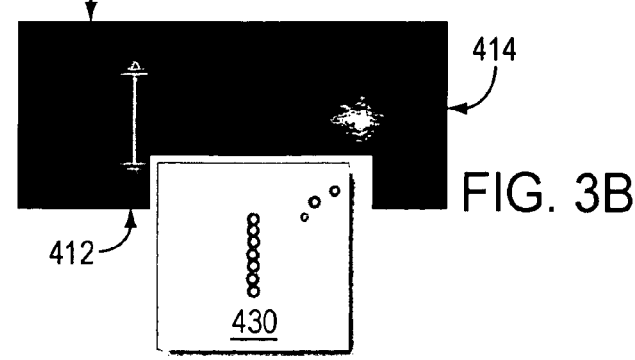
FIG. 3B
FIG. 3C

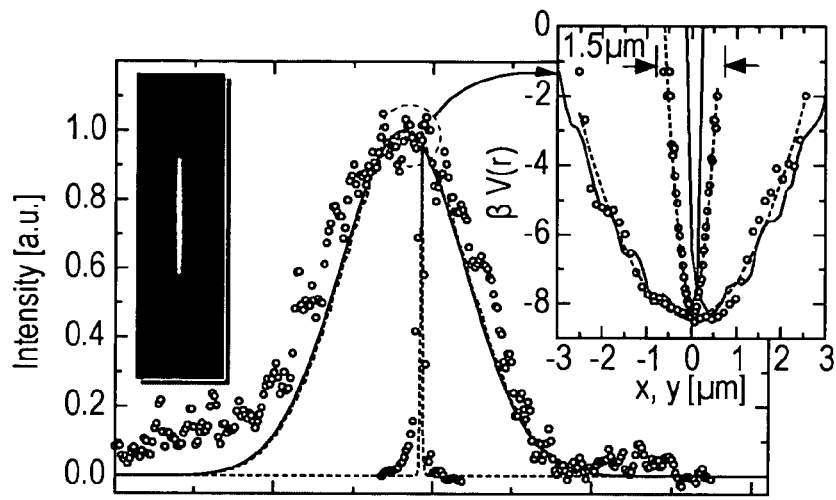
FIG. 4A
FIG. 4B
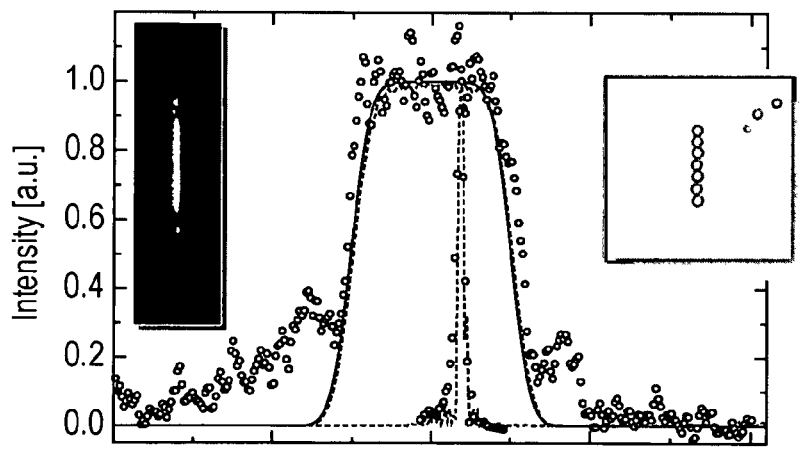
FIG. 4C
FIG. 4D
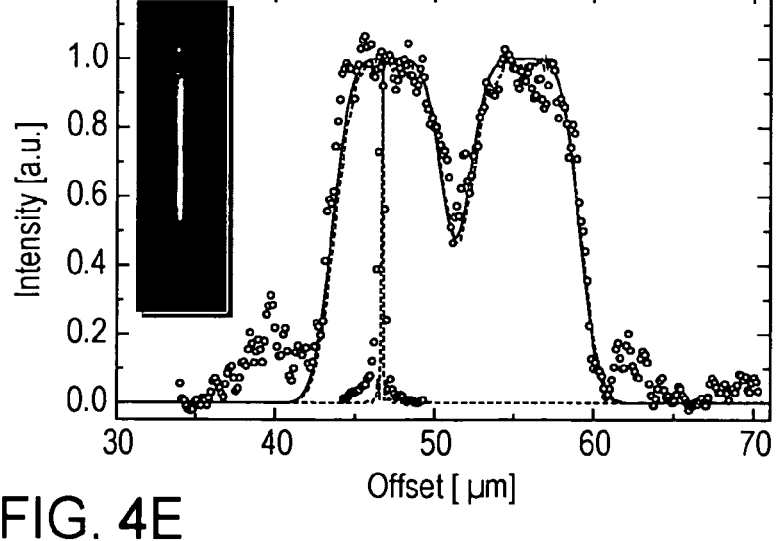
FIG. 4E

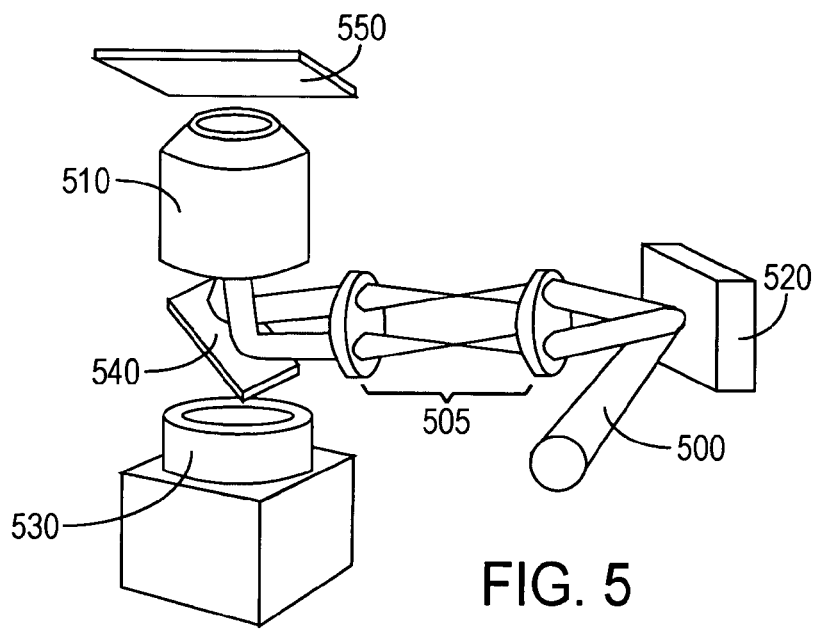
FIG. 5
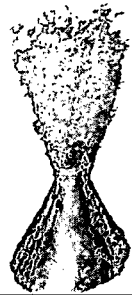
FIG. 6A
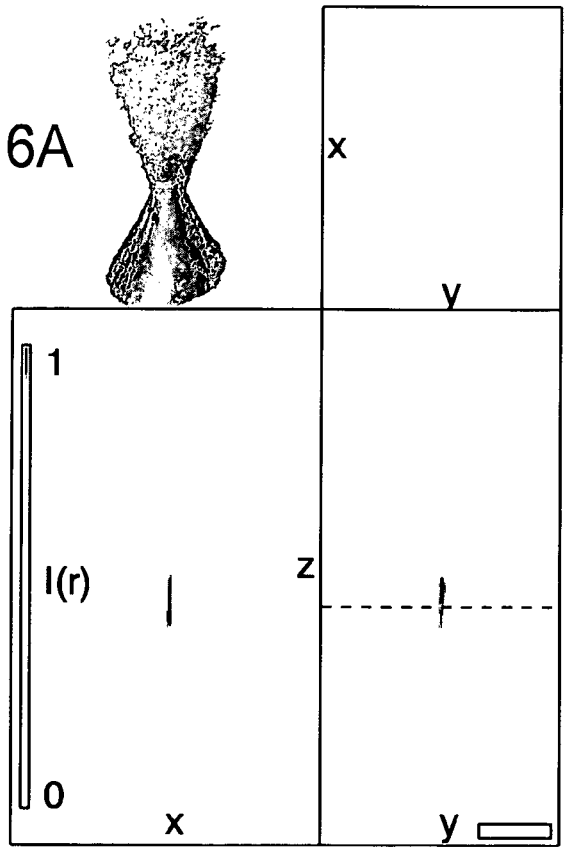
FIG. 6B
FIG. 6C
FIG. 6D

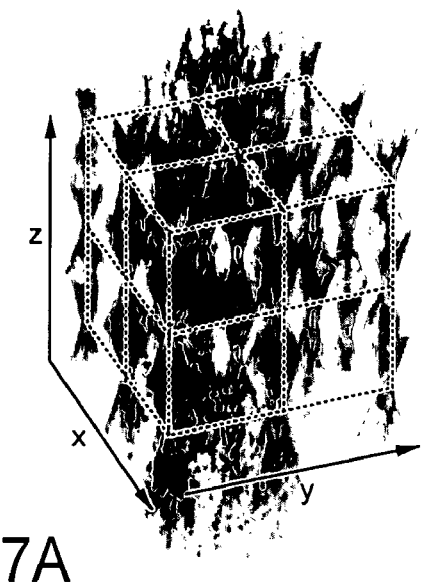
FIG. 7A
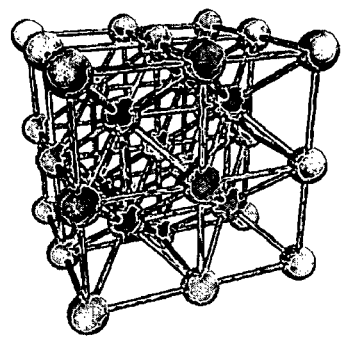
FIG. 7B
FIG. 8A
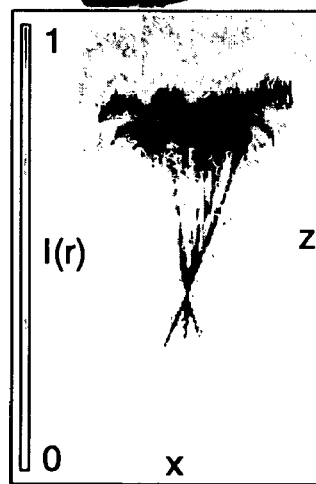
FIG. 8D
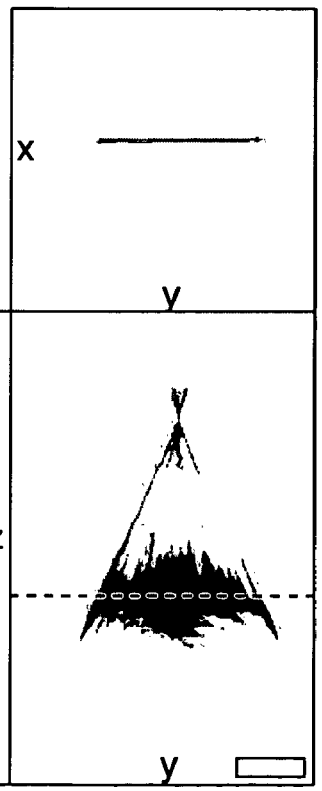
FIG. 8B
FIG. 8C

US 7,491,928 B2

EXTENDED OPTICAL TRAPS BY SHAPE-PHASE HOLOGRAPHY

This invention was made with US Government support under Grant No. DMR-0451589 awarded by the National Science Foundation. The US Government has certain rights in this invention.

FIELD OF THE INVENTION

The present invention relates generally to a system and method for controllably establishing extended optical traps for processing materials for a wide variety of uses. More particularly the invention relates to the use of shape-phase modulation or holography to establish a variety of shapes of optical traps, such as lines, curves and three dimensional shapes for manipulating, orienting, manufacturing and processing of objects ranging from nanoscale to micrometer scale objects.

BACKGROUND OF THE INVENTION

Various attempts have been made in the prior art to extend a single point-like optical trap into lines, curves and three dimensional shapes, but serious deficiencies are inherent in all such efforts. For example, line tweezers have been implemented with a cylindrical lens or its holographic equivalent. A line formed with a cylindrical lens is degraded by severe astigmatism, however, and therefore cannot trap objects in three dimensions. A cylindrical lens also cannot produce more general structures, only linear extended traps. Line traps also have been formed with pairs of cylindrical lenses arranged in a Keplerian telescope. Although such line traps can be free from astigmatism, their shape is fixed, and their intensity and phase profiles cannot be altered. Such line traps also are incompatible with the holographic optical trapping technique, and therefore cannot be integrated with the variety of trapping capabilities made possible by holographic projection. In another prior art methodology extended optical traps have been created by time sharing or scanning of optical traps. This method suffers from various disadvantages described in detail hereinafter.

In yet another prior art methodology extended optical traps can be projected by conventional holographic techniques. This approach does not allow for general three dimensional structures for the projected line and suffers from projection deficiencies, such as optical speckle. Further disadvantages will be described hereinafter as part of the description of this invention, thus demonstrating the substantial advantages over the prior art.

SUMMARY OF THE INVENTION

A single-beam optical gradient force trap can be generalized to establish its domain of influence along a specified curve or volume with a predetermined intensity to define lines and volumes of optical trap influence. Such an extended trap and the attendant domain of influence can be generated by use of shape-phase modulation or holography. This can furthermore extend to projecting a plurality of such traps. Extended optical traps can for example be implemented for one-dimensional potential energy wells to manipulate nanometer scale to micrometer-scale objects. Trapping one, two, or more such objects in a single, tailored and well-characterized extended potential energy well has numerous applications in process monitoring, quality control, process control and nanomanufacturing, as well as in research and other fields.

The simplest extended optical trap takes the form of a so-called line tweezer, in which an appropriately structured beam of light focuses to a segment of a line, rather than to a spot. Such line tweezers have been implemented with a cylindrical lens, or with its holographic equivalent. The resulting trap has some undesirable characteristics, however. A line trap projected with a cylindrical lens actually has the three-dimensional structure of a conventional optical tweezer degraded by severe astigmatism. Consequently, it focuses to a line along one axis in one plane and to a perpendicular line in another plane. The two lines cross on the beam's axis, which decreases axial intensity gradients at that point, and thus severely degrades such traps' ability to trap objects in three dimensions. Cylindrical lenses also can project only a single line tweezer, and offer no control over the intensity and phase profiles along the line. Finally, cylindrical lenses can only project linear extended traps, and not more general structures. The system described hereinafter avoids these shortcomings by allowing for the creation of one or more extended traps, each of which focuses to a single curve on a specified trapping manifold, and each of which has an independently specified intensity and phase profile along its length.

In the prior art, extended optical traps also have been created in a time-shared sense by scanning a single optical tweezer rapidly across the field of view. Provided the tweezer travels rapidly enough, a trapped object cannot keep up with the tweezer, but rather experiences an extended potential whose characteristics reflect a time average of the tweezer's transit. This has the disadvantage that high peak laser powers are required to maintain even a modest average well depth, and this can degrade light-sensitive samples. The scanned laser also can impart transient energy or impulses to briefly illuminated objects, which can result in subtle yet undesirable nonequilibrium effects. Finally, scanned optical tweezers typically operate in only a single plane and not along more general curves in three dimensions. The system described here avoids these drawbacks by offering continuous illumination over its entire length of the projected traps. Such a system also offers the ability to project extended optical traps along three-dimensional curves, as will be illustrated in the sections hereinafter.

Extended optical traps might also be projected by conventional holographic methods. In this case, a phase-only or amplitude-only hologram encoding the desired curve is projected into a sample. Most such holograms, however, do not specify the three-dimensional structure of the projected line, and thus do not optimize the intensity gradients necessary for optical trapping in all three dimensions. Conventional holographic line traps also suffer from projection deficiencies such as speckle. These alter the intensity distribution along the projected curve in such a way as to degrade the intended potential energy well structure. Because the phase transfer function encoding such a holographic line trap is related in an intrinsically nonlinear manner to the intensity pattern that is projected, optimizing to correct for projection deficiencies is difficult. The system described herein avoids these difficulties by encoding both phase and amplitude information in the shape of a phase hologram, as well as in its phase values. The result is a specific, smoothly varying trapping pattern that can be adaptively optimized. For example, the trap in a preferred embodiment is best extended along a line perpendicular to an optical axis and virtually any light distribution intensity or phase profile can be imposed along the line. Such light illumination can be continuous along the selected line (or curve as explained hereinafter) such that a low intensity can be used thereby avoiding sample damage. These types of extended traps can be created or established by a conventional holographic trap system provided the appropriate phase and amplitude hologram is utilized. These extended line traps can also be used with additional trapping modalities, such as optical vortices, which can be mixed with extended optical traps with each modality defined by a specific operation on the wavefronts of the light designed to implement a new functionality.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 illustrates a schematic diagram of an optical trap used to project extended optical traps;

FIG. 2 illustrates a phase mask function encoding a uniformly bright line tweezer;

FIG. 3A illustrates a calculated intensity pattern; FIG. 3B illustrates an experimental pattern; and FIG. 3C illustrates the extended optical traps aligning and trapping seven polystyrene spheres of 1.5 from diameter and dispersed in water;

FIG. 4A illustrates a Gaussian calculation for imaging photograph of holographic line tweezers longitudinal and transverse intensity profiles (circles); the inset is an image of the projected light and FIG. 4B being the measured potential energy well for a 1.5 micrometer diameter polystyrene spheres in water at 1.5 mW laser power and the dashed line shows a parabolic fit; FIG. 4C is a uniform line calculation with the projected light onset; FIG. 4D is a bright field image of the seven spheres trapped on the line; and FIG. 4E is a double-well flat-top profile calculation and with the projected light inset;

FIG. 5 illustrates another system for projecting an extended optical trap with a computer generated hologram;

FIG. 6A illustrates a three dimensional reconstruction of an optical tweezer propagating along the axis; FIG. 6B shows a cross section in the xy phase; FIG. 6C shows a cross section in the yz phase with the horizontal dashed line indicating the phase $z=z_o$ in which its xy section is obtained and FIG. 6D shows a cross section in the xz phase with the inset isosurface enclosing 95% of the incident light; and the scale bar in FIG. 6C is indicative of 5 micrometers and the cross sections in each plane are gray scale intensity level for the inset scale in FIG. 6D;

FIG. 7A illustrates a volumetric representation of 35 optical tweezer arranged in the body centered cubic lattice of FIG. 7B;

FIGS. 8A-8D illustrate reconstruction of a cylindrical line tweezer and should be compared with FIG. 6A-6D as their respective counterparts.

DETAILED DESCRIPTION OF THE PREFERRED EMBODIMENT

Figures 9A, 9B, 9C, 9D:
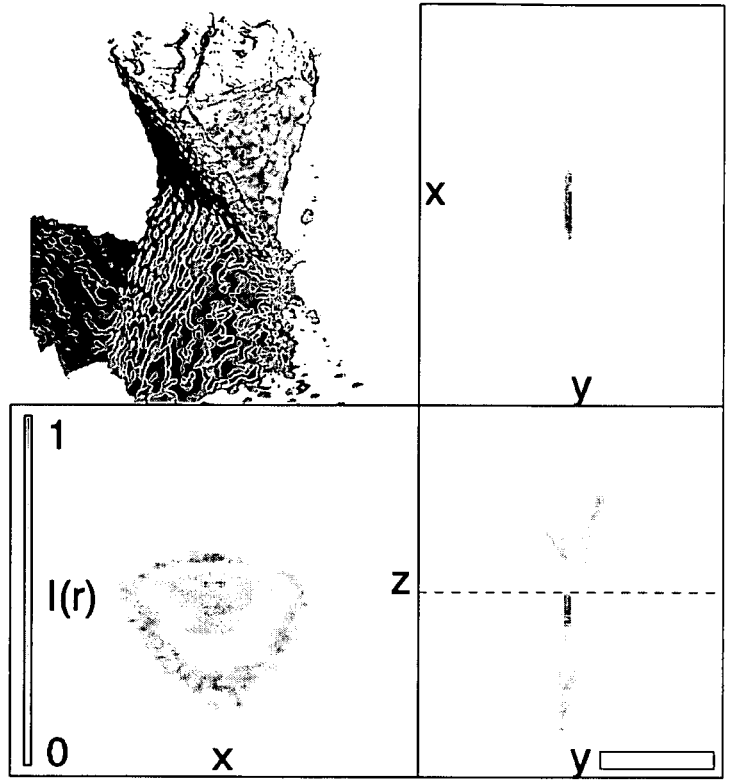
FIG. 9A-9D illustrates a three dimensional sequential reconstruction of a holographic optical line trap in accordance with an embodiment of the invention and should be compared with FIGS. 6A-6D and 8A-8D.

FIG. 1 schematically represents a typical optical train or system 90 that can be used to project extended optical traps. A laser 100 projects a beam of light 110 to an objective lens 120, which focuses the beam into an optical trap within a sample 130. Typically, a beam expander 140 is required so that the diameter of the beam matches the input aperture of the focusing lens 120 to form the strongest possible optical trap. In this implementation, a dichroic mirror 150 is shown reflecting the laser beam 110 into the objective lens 120. This permits images to be created of objects interacting with the trap, the imaging light passing through the dichroic mirror 150. In a typical implementation, imaging light can be focused onto the sample 130 by a condenser lens 200, collected by the objective lens 120, and relayed to a camera 210 by an eyepiece 220.

If there were no additional functionality, this system 90 would project a single conventional optical tweezer. The addition of an appropriately configured diffractive optical element (DOE) 300 and additional relay optics 310 enables the system 90 to project extended optical traps. The most preferred DOE 300 in FIG. 1 is a spatial light modulator (SLM), which is a device capable of encoding the pattern of phase modulation defining a diffractive optical element, typically under computer control. An SLM form of the DOE 300 is particularly useful when a sequence of trap-forming holograms is to be projected, but is not necessary for practice of the present invention. In other implementations where a single pattern of extended optical traps is required, a static form of the DOE 300 can be substituted for the SLM. This system 90 already has been shown to be useful for projecting holographic optical traps (HOTs), and can be used to project several classes of extended optical traps in addition to the class under discussion here. Specifically, holographic optical traps can project optical vortices, which are ring-like optical traps that exert torque as well as force. The HOT technique also can be used to project generalized optical vortices whose curve of maximum intensity can fall along an arbitrary specified curve. Optical vortices and their generalizations have two principal drawbacks: the torque they exert cannot be eliminated, and is not desirable for all applications, and their intensity profile cannot be specified. HOTs also can project Bessel beams, which are one-dimensional axial line traps. These, however, are limited to forming line traps along the optical axis, they exert forces along their length, and their intensity profile cannot be specified. Finally, the HOT technique also can project cylindrical line traps and holographic line traps, both of which suffer from the implementational problems discussed hereinbefore.

An extended line trap differs from these other types of holographic optical traps in the nature of the DOE 300 used to project it. In particular, projecting extended traps requires encoding both phase and amplitude information in the hologram, whereas conventional holographic optical traps require only phase information. We encode both phase and amplitude information in a phase-only DOE by specifying the shape of the domain within the DOE 300 over which phase information is encoded. The use of phase information to create extended optical traps is one particularly useful embodiment. In the following paragraphs we explain the principle of shape-phase modulation or shape-phase holography and its application to creating extended optical traps with specified shapes and force profiles. As a concrete example, we present the implementation of a uniform line tweezer. Further, we describe methods for modifying the trap's outline from a line segment in the plane to a more general curve in three dimensions for volumetric applications.

An ideal line tweezer focuses to a line segment with a specified intensity distribution and has the steepest possible intensity gradients in all directions perpendicular to the line. This can be achieved in principle by inverting the mathematical relationship between light in the lens' focal volume and the electric field in the plane of the DOE 300. The result generally involves modulating both the amplitude and phase of the incoming light, which is not possible given the DOE 300 that modulates only phase or only amplitude. The key point in the present invention is that a line tweezer is inherently one-dimensional, and thus both its amplitude and phase information can be encoded in a two-dimensional phase-only DOE 300 by using one dimension to encode phase information and the transverse dimension to encode amplitude information.

As an example, we form a uniformly bright line tweezer of length L aligned with the ŷ axis in the lens' focal plane. The field in the trapping plane may be approximated as $$\Psi(r) = \begin{cases} \delta(x), & |y| < \frac{L}{2} \\ 0, & \text{otherwise} \end{cases} \quad (1)$$

The inverse Fourier transform of this field yields the associated field in the DOE plane;

$$\Psi(\rho) = \mathrm{sinc}(k\rho_y) = \frac{\sin(k\rho_y)}{k\rho_y}, \text{ where } k = \frac{\pi}{L}, \quad (2)$$

which is a purely real-valued function. Because $\Psi(\rho)$ involves only amplitude modulations and has both negative and positive values, it might not seem possible to encode it on a phase-only DOE 300. However, $\Psi(\rho)$ does not depend on $\rho_x$, and this presents the opportunity on which shape-phase modulation is based.

We rewrite the input field as:

$$\Psi(\rho) = A(\rho) \exp(i\phi(\rho)), \quad (3)$$

where $A(\rho)$ is a positive definite amplitude and $\phi(\rho)$ is a real-valued phase. By inspection of Eq. (2), $$A(\rho) = |\mathrm{sinc}(k\rho_y)| \quad (4)$$

and, noting that $$\varphi(\rho) = \frac{\pi}{2}[1 + \mathrm{sgn}(\mathrm{sinc}(k\rho_y))] \quad (5)$$

where $$\mathrm{sgn}(x) = \begin{cases} 1, & x > 0 \\ 0, & x = 0 \\ -1 & x < 0 \end{cases} \quad (6)$$

If we assume that the DOE 300 is uniformly illuminated, then $A(\rho) = A(\rho_x)$ may be interpreted as the fraction of light incident on the DOE at $\rho_y$ that is allowed to pass through to form the trap. For a pixellated DOE, this corresponds to the fraction of the pixels along the row at $\rho_y$ that contribute to the hologram. Light passing through the other pixels does not contribute to the hologram, and must be diverted away from the projected pattern. The resulting division of the input field into regions that contribute to the hologram and regions that do not constitutes the shape component of shape-phase holograms. It is worth emphasizing that $A(\rho)$ is independent of $\rho_x$ for any linear trap aligned along ŷ. and $\phi(\rho)$ are both independent of $\rho_x$ for the special case of a uniformly bright line.

Consequently, the amplitude function $A(\rho_y)$ specifies how many pixels at $\rho_y$ contribute to the hologram, but not which pixels contribute. This offers additional latitude for creating multiple line traps and for combining line traps with other trapping modalities, as we will show below.

For the uniform line tweezer, therefore, one appropriate phase function is $$\varphi(\rho) = \begin{cases} \frac{\pi}{2}[1 + \mathrm{sgn}(\mathrm{sinc}(k\rho_y))], & |\rho_x| < \frac{1}{2}A(\rho_y) \\ \text{unassigned} & \text{otherwise} \end{cases} \quad (7)$$

Light passing through the unassigned region ordinarily would be brought to a focus in the middle of the focal plane, where it would contribute to forming a conventional optical tweezer. Alternately, the light can be diverted away from the line by imposing a conventional displacing phase function:

$$\varphi(\rho) = q \cdot \rho_1 \text{ for } |\rho_x| \geq \frac{1}{2}A(\rho_y), \quad (8)$$

where q is a constant wavevector describing the unassigned light's displacement. Such a displacement function accounts for the scalloped background in the DOE phase function 400 in FIG. 2. Here, a smooth gradient along $\hat{\rho}_x$ is wrapped around at a phase value of $2\pi$ to create an equivalent sawtooth phase function. The line tweezer also can be displaced away from the optical axis by adding a phase function of the form of Eq. (8) to the assigned pixels. Light passing through the unassigned pixels still can be diverted to another direction by selecting a different value of q for the unassigned pixels.

The extra light also can be dispersed by assigning random phase values to the unassigned phase pixels. Finally, the extra light can be used to construct additional line tweezers. This extra functionality requires the line traps to be displaced relative to the optical axis so that they do not overlap. The unassigned region also can be applied to other applications such as creating conventional optical tweezers, optical vortices, and other optical trapping modalities.

For example, a uniform line tweezer can be projected with $$\phi_s(\rho) = \phi(\rho_y)S(\rho), \text{ where} \quad (9)$$

$$S(\rho) = \begin{cases} 1, & |\rho_x| < A(\rho_y) \\ 0, & \text{otherwise} \end{cases} \quad (10)$$

The shape function $S(\rho)$ divides the plane of the DOE into assigned (S=1) and unassigned (S=0) regions. Light passing through the unassigned region can be diverted, diffused, or applied to another task by applying another phase mask, $\phi_{1-S}(\rho)$, to the unassigned pixels. Light passing through the assigned region then has both the phase and amplitude structure needed to form the extended optical trap.

FIG. 2 shows a phase-only hologram that encodes a uniform line tweezer L=15 μm long according to Eq. (9) and uses the unassigned pixels to project a conventional optical tweezer displaced laterally by 50 micrometers. The calculated intensity pattern, shown in FIG. 3A, agrees closely with the actual light distribution measured by placing a mirror in the sample plane and collecting the reflected light with the objective lens, FIG. 3B.

The line trap 410 in FIG. 2 suffers from three easily remedied defects. The analytical shape function described by Eq. (10) creates transverse artifacts at the line's ends. These are eliminated by replacing S(ρ) with a random distribution that assigns the correct number of pixels in each column. The abrupt intensity gradients called for in Eq. (3) furthermore exceed a practical DOE's spatial bandwidth, and so cause oscillatory deviations from the designed intensity profile. This is an example of Gibbs phenomenon, which can be minimized by modifying the trap's design to reduce gradients, or through standard numerical methods. The results in FIG. 4A-4E show the benefits of these corrections.

When powered by 15 mW of light, each of these line tweezers readily traps micrometer-scale colloidal spheres in three dimensions, while allowing them some freedom of motion along the extended axis. We characterized the extended traps' potential energy profiles for 1.5 μm diameter polystyrene spheres (Duke Scientific Lot 5238) by placing a single particle on the line and tracking its thermally driven motions at 1/30 sec intervals and 10 nm spatial resolution through digital video microscopy. The probability $P(r)d^2r$ to find the particle within $d^2r$ of position r in equilibrium is related to the local potential V(r) by Boltzmann's equation, $$P(r) = \exp(-\beta V(r)), \qquad (11)$$

where $\beta^{-1} = k_B T$ is the thermal energy scale at absolute temperature T. A single particle's trajectory over ten minutes yields the results in FIG. 4A. The longitudinal potential energy profile closely follows the designed shape and is 30±7 $k_B T$ deep. The bottom third of the well is plotted in FIG. 4A together with a fit to a parabolic profile. Deviations from the designed shape are smaller than 0.8 $k_B T$. These could be further reduced by adaptive optimization. The transverse profile is broadened by the sphere's diameter, as expected.

This system 90 shown in FIG. 1 was preferably used to implement the line trap 410. Here the phase function 400 incorporates the shape-phase hologram described by Eq. (7) and displaces the unassigned light using Eq. (8). As shown in FIG. 3A, both an extended line trap 412 and the diverted tweezer 414 are shown in an intensity distribution calculated for this phase function 400. Results showing the experimental version of the line trap 412 and the diverted tweezer 414 projected in practice are shown in the photograph of FIG. 3B. This line trap 412 is sixteen micrometers long. The inset photograph of FIG. 3C shows this extended optical trap trapping seven polystyrene spheres, each 1.5 micrometers in diameter, dispersed in water.

Other modifications to the phase mask 400, which have been described in applications apart from the invention herein, can be used to translate the line tweezer along the optical axis, to correct for aberrations in the system 90, and to account for such defects in the system 90 as phase scaling errors.

Unlike line traps created with cylindrical lenses, or their equivalent, this shape-phase holographic line trap 410 is not simply astigmatic, but rather has the three-dimensional structure of an extended cone. This structure is ideal for optical trapping because it yields the strongest possible axial intensity gradients. Consequently, it successfully traps objects along its length without intercession of a substrate or other sources of force.

Multiple extended optical traps can be projected with the same DOE provided their shape functions $S_j(\rho)$ are disjoint in the sense that $\int_\Omega S_i(\rho) S_j(\rho) d^2\rho = 0$ for $i \ne j$. The assigned domain then is $S(\rho) = \Sigma_j S_j(\rho)$. Other modifications to the phase mask 400 that have been described in other contexts can be used to translate the line trap 410 along the optical axis, to correct for aberrations in the optical train, and to account for such defects in the optical train as phase scaling errors. Finally, the shape-phase modulation can be generalized for intensity modulation of curved tweezers by applying an appropriate conformal mapping to the phase mask 400.

The shape-phase modulation can be generalized for intensity modulation of curved tweezers. For this we identify a curve in the reciprocal lattice that is projected into the desired curved tweezer or trap. Modulation of intensity of the reciprocal curve result in modulation of the intensity over the curved tweezer. In order to achieve the desired modulation, the shape in the normal direction to the curve is set by the amplitude function while the phase of each segment along this line is determined by the phase of the quasi one-dimensional equivalent problem (similarly for the line shape-phase modulation). This results in a two dimensional curved tweezer or trap.

Addition of a phase function or the mask 400 that can be described by a conformal mapping (e.g a distorted lens phase) can bend this line into a three dimensional curve, and result in three dimensional extended trap. The resulting conformal mapping mask can be included only in the amplitude shape area (e.g a cylindrical lens phase can help modify the width of a line trap), or can cover all of the phase mask 400 (e.g a radial phase can shift the focus plane from the central spot). Thus a mixed shape-phase modulation and conventional phase modulation can be applied together to form a mixed modulation mode.

Extension of Optical Traps to Three Dimensions

In the following a detailed view is provided of extended optical traps' three-dimensional intensity distributions which can be created and compared with other classes of extended optical traps.

These embodiments are based on a preferred optimized holographic trapping technique, shown schematically in FIG. 5. Here, a beam of laser light 500 from a frequency-doubled solid-state laser (not shown) (Coherent Verdi) operating at a wavelength of λ=532 nm is directed through relay optics 505 to the input pupil of a high-numberical-aperture objective lens 510 (Nikon 100× Plan Apo, NA 1.4, oil immersion) that focuses it into an optical trap. The laser beam 500 is imprinted with a phase-only hologram by a computer-addressed liquid-crystal spatial light modulator 520 (SLM, Hamamatsu X8267 PPM) in a plan conjugate to the objective's input plan. As a result, the light field, ψ(r), in the objective's focal plan is related to the field ψ(r), in the objective's focal plan is related to the field ψ(p) in the plane of the SLM 520 by the well known Fraunhofer transform:

$$\psi(r) = -\frac{i}{\lambda f} \int_\Omega \phi(\rho) \exp\left(-i\frac{2\pi}{\lambda f} r \cdot \rho\right) d^2\rho, \qquad (12)$$

where f is the objective's focal length, where Ω is the optical train's aperture, and where we have dropped irrelevant phase factors. Assuming that the laser illuminates the SLM 520 with a radially symmetric amplitude profile, u(ρ), and uniform phase, the field in the SLM's plane may be written as $$\psi(\rho) = u(\rho) \exp(i\phi(\rho)), \qquad (13)$$

where φ(ρ) is the real-valued phase profile imprinted on the laser beam 500 by the SLM 520. The SLM 520 in our system imposes phase shifts between 0 and 2π radians at each pixel of a 768×768 array. This two-dimensional phase array can be used to project a computer-generated phase-only hologram, $\phi(\rho)$, designed to transform the single optical tweezer into any desired three-dimensional configuration of optical traps, each with individually specified intensities and wavefront properties.

Ordinarily, the pattern of holographic optical traps would be put to use by projecting it into a fluid-borne sample mounted in the objective's focal plane. To characterize the light field, we instead mount a front-surface mirror in the sample plane. This mirror reflects the trapping light back into the objective lens 510, which transmits images of the traps through a partially reflecting mirror 540 to a charge-coupled device (CCD) camera 530 (NEC TI324AII). In our implementation, the objective lens 510, camera eyepiece are mounted in a conventional optical microscope (Nikon TE-2000U).

Three-dimensional reconstructions of the optical traps' intensity distribution can be obtained by translating the mirror 540 relative to the objective lens 510. Equivalently, the traps can be translated relative to fixed mirror 550 by superimposing the parabolic phase function.

$$\varphi_z(\rho) = -\frac{\pi \rho^2 z}{\lambda f^2}, \tag{14}$$

onto the hologram $\phi_0(\rho)$ encoding a particular pattern of traps. The combined hologram, $\phi(\rho)=\phi_0(\rho)+\phi_z(\rho) \bmod 2\pi$, projects the same pattern of traps as $\phi_0(\rho)$ but with each trap translated by $-z$ along the optical axis. The resulting image obtained from the reflected light represents a cross-section of the original trapping intensity at distance z from the objective's focal plane. Translating the traps under software control is particularly convenient because it minimizes changes in the optical train's properties due to mechanical motion. Images obtained at each value of z are stacked up to yield a complete volumetric representation of the intensity distribution.

The objective lens 510 captures essentially all of the reflected light for $z \leq 0$. For $z>0$, however, the outermost rays of the converging trap are cut off by the objective's output pupil, and the contrast is reduced accordingly. This could be corrected by multiplying the measured intensity field by a factor proportional to z for $z>0$. The appropriate factor, however, is difficult to determine accurately, so we present only unaltered results.

FIGS. 6A-6D shows a conventional optical tweezer reconstructed in this way and displayed as an isointensity surface at 5 percent peak intensity and in three cross-sections. The former is useful for showing the over-all structure of the converging light, and the cross-sections provide an impression of the three dimensional light field that will confine an optically trapped object. The angle of convergence of 63° in immersion oil obtained from these data is consistent with an overall numerical aperture of 1.4. The radius of sharpest focus, $r_{min} \approx 0.2$ micrometers, is consistent with diffraction-limited focusing on the beam.

These results highlight two additional aspects of this reconstruction technique. The objective lens 510 is designed to correct for spherical aberration when light passing through water is refracted by a glass coverslip. Without this additional refraction, the projected optical trap actually is degraded by roughly 20λ of spherical aberration, introduced by the objective lens 510. This reduces the apparent numerical aperture and also extends the trap's focus along the z axis. The trap's effective numerical aperture in water would be roughly 1.2.

The effect of spherical aberration can be approximately corrected by pre-distorting the beam with the additional phase profile, $$\varphi_a(\rho) = \frac{a}{\sqrt{2}} (6x^4 - 6x^2 + 1), \tag{15}$$

The Zernike polynomial describes spherical aberration. The radius, x, is measured as a fraction of the optical train's aperture, and the coefficient a is measured in wavelengths of light. This procedure is used to correct for small amount of aberration present in practical optical trapping systems to optimize their performance.

This correction was applied to the array of 35 optical tweezers shown as a three-dimensional reconstruction in FIGS. 7A and 7B. These optical traps of FIG. 7A are arranged in a three-dimensional body-centered cubic (BCC) lattice of FIG. 7B with a 10.8 micrometer lattice constant. Without correcting for spherical aberration, these traps would blend into each other along the optical axis. With correction, their axial intensity gradients are clearly resolved. This accounts for holographic traps' ability to organize objects along the optical axis.

The amount of spherical aberration caused by projecting into immersion oil rather than water is so large that the combination of $\phi_z(\rho)$ and $\phi_a(\rho)$ can exceed the spatial bandwidth of the SLM 520 for all but the simplest trapping patterns, $\phi_o(\rho)$. We therefore provide more complex traps without aberration correction. In particular, we used uncorrected volumetric imaging to illustrate the comparative advantages of extended optical traps created by recently introduced holographic techniques.

Extended optical traps have been projected in a time-shared sense by rapidly scanning a conventional optical tweezer along the trap's intended contour. A scanned trap has optical characteristics as good as a point-like optical tweezer, and an effective potential energy well that can be tailored by adjusting the instantaneous scanning rate. Kinematic effects due to the trap's motion can be minimized by scanning rapidly enough. For some applications, however, continuous illumination or the simplicity of an optical train with no scanning capabilities can be desirable.

Continuously illuminated line traps have been created by expanding an optical trap along one direction. This can be achieved, for example, by introducing a cylindrical lens into the objective's input plane. Equivalently, a cylindrical-lens tweezer can be implemented by encoding the function $\phi_c(\rho) = \pi z_0 \rho_x^2/(\lambda f^2)$ on the SLM 520. The results, shown in FIGS. 8A-8D appear serviceable in the plane of best focus, $z=z_o$, with the point-like tweezer having been extended to a line with a nearly uniform intensity profile and parabolic phase. The three-dimensional reconstruction in FIG. 8A, however, reveals that the cylindrical lens merely introduces a large amount of astigmatism into the beam, creating a second focal line perpendicular to the first. This is problematic because the astigmatic beam's intensity gradients are severely weakened along the optical axis compared with a conventional optical tweezer. Consequently, cylindrical lens line traps typically cannot localize objects against radiation pressure along the optical axis.

Replacing the single cylindrical lens with a cylindrical Keplerian telescope eliminates the astigmatism and thus creates a stable three-dimensional optical trap. Similarly, using an objective lens to focus two interfering beams creates an interferometric optical trap capable of three-dimensional trapping. These approaches, however, offer little control over the extended traps' intensity profiles, and neither affords control over the phase profile.

Shape-phase holography provides absolute control over both the amplitude and phase profiles of an extended optical trap at the expense of diffraction efficiency. It also yields traps with optimized axial intensity gradients, suitable for three-dimensional trapping. If the line trap is characterized by an amplitude profile $u(\rho_x)$ and a phase profile $p(\rho_x)$ along the $\rho_x$ direction in the objective's focal plan, then the field in the SLM plane is given by Eq. (12) as $$\psi(\rho)=u(\rho_x)\exp(ip(\rho_x)), \quad (16)$$

Where the phase $p(\rho_x)$ is adjusted so that $u(\rho_x)>0$. Shape-phase holography implements this one-dimensional complex wavefront profile as a two-dimensional phase-only hologram $$\varphi(\rho) = \begin{cases} p(\rho_x), & \rho \in S(\rho), \\ q(\rho), & \rho \notin S(\rho) \end{cases} \quad (17)$$

Where the shape function $S(\rho)$ allocates a number of pixels along the row $\rho_y$, proportional to $u(\rho_x)$. One particularly effective choice is for $S(\rho)$ to select pixels randomly along each row in the appropriate relative numbers. The unassigned pixels then are given values $q(p)$ that redirect the excess light away from the intended line. Typical results are presented in FIGS. 9A-9D.

Unlike the cylindrical-lens trap, the holographic line trap focuses as a conical wedge to a single diffraction limited line in the objective's focal plane. Consequently, its transverse angle of convergence is comparable to that of an optimized point trap. This means that the holographic line trap has comparably strong axial intensity gradients, which explains its ability to trap objects stably against radiation pressure in the z direction.

The line trap's transverse convergence does not depend strongly on the choice of intensity profile along the line. Its three-dimensional intensity distribution, however, is very sensitive to the phase profile along the line. Abrupt phase changes cause localized suppression of the line trap's intensity through destructive interference. Smoother variations do not affect the intensity profile along the line, but can substantially restructure the beam. The line trap created by a cylindrical lens, for example, has a parabolic intensity profile and also a parabolic phase profile. Inserting this choice into Eq. 13 and calculating the associated shape-phase hologram with Eqs. (12) and (17) yields the idealized cylindrical lens phase transfer function. This observation opens the door to applications in which the phase profile along a line can be tuned to create a desired three-dimensional intensity distribution, or in which the measured three-dimensional intensity distribution can be used to assess the phase profile along the line.

Numerous uses are contemplated using the extended optical traps for chemical, mechanical, electrical and biological processing of materials, including without limitation manipulation, probing, selected chemical and biological reaction, testing, manufacture and assembly of materials. In one example use, functionalized spheres (or any type of particle or mass) can be positioned along a line established as an extended optical trap. Such assemblies or particles can also be probed and reacted and interactions between and among particles readily ascertained. In addition nanowires can be readily manipulated, probed and processed using extended traps. Particle or nanowires or other mescopic material can be disposed in programmable potential wells of such extended traps to measure interactions and character of the trapped material. Measurements are also easily performed under such well established one dimensional states which can be formed, rather than having to deconvolute information from more complicated two and three dimensional arrangements of particles or material. Both similar and dissimilar materials can be probed by means of extended optical traps and corrections for optical perturbations or other complications can readily be effectuated using extended optical trap formalisms. These techniques have a wide array of applications for physical, chemical, electronic, mechanical, optical, and biological systems. In addition extended optical traps can be utilized for manufacturing and assembly purposes due to their programmable nature and flexibility. In chemical, biological and electrical applications such extended traps can be used to programmably react materials, assemble macromolecules, electronic circuits and create nanoscale biological media not previously achievable. In the area of manufacturing and processing, a phase only pattern can be imposed along a line or curve wherein the intensity remains constant but the optical force can be programmed to any profile allowing movement, acceleration and deceleration which can be part of a nanomanufacturing assembly or production line. In yet another example microfluidic systems can be constructed and operated using extended optical traps.

It should be understood that various changes and modifications referred to in the embodiment described herein would be apparent to those skilled in the art. Such changes and modifications can be made without departing from the spirit and scope of the present invention.

What is claimed is:

1. A method for establishing extended optical traps for processing materials, comprising:
   providing a light beam;
   applying a diffractive optical element to the light beam, the diffractive optical element including phase information and amplitude information to create the extended optical trap; and
   employing the extended optical trap for processing materials.

2. The method as defined in claim 1 wherein the diffractive optical element comprises a spatial light modulator.

3. The method as defined in claim 1 wherein the phase information and amplitude information is provided by specifying a phase-only diffractive optical element in conjunction with domain shape and the diffractive optical element over which the phase information is encoded.

4. The method as defined in claim 1 where in the step of employing the extended optical trap comprises establishing at least one of a uniform line tweezer and a general curve in three dimensions.

5. The method as defined in claim 1 wherein the phase information and amplitude information is encoded in a two-dimensional phase-only diffractive optical element.

6. The method as defined in claim 5 wherein the encoding step includes using one dimension to encode phase information and a transverse dimension to encode amplitude information.

7. The method as defined in claim 1 wherein an amplitude function $A(\rho_y)$ of an electromagnetic field is controllable for creating multiple ones of the extended optical line traps.

8. The method as defined in claim 7 wherein the amplitude function is constructed to combine the line traps with additional trapping modalities.

9. The method as defined in claim 7 further including the step of imposing a displacing phase function on the diffractive optical element in order to divert light away from a line.

10. The method as defined in claim 9 wherein the displacing phase function further includes a constant wave vector having a selectable value for unassigned pixels for controllably diverting the light to another direction.

11. The method as defined in claim 10 wherein a shape function $S(\rho)$ allows controlled projection of a uniform line trap.

12. The method as defined in claim 11 further including the step of displacing a plurality of extended optical line traps relative to an optical axis such that each of the line traps do not overlap.

13. The method as defined in claim 1 wherein the extended optical trap comprises a uniform line trap having an appropriate phase function imposed on the diffractive optical element such that light passes through an unassigned region of light pixels for subsequent manipulation.

14. The method as defined in claim 13 including the step of imposing a displacement phase function to implement the subsequent manipulation.

15. The method as defined in claim 1 further including imposition of a phase function on the diffractive optical element which generates a three-dimensional intensity distribution.

16. The method as defined in claim 15 wherein the phase function comprises a parabolic phase function.

17. The method as defined in claim 1 wherein the light beam comprises a laser beam.

18. The method as defined in claim 1 wherein light intensity is maintained constant and only the phase information is controlled to vary force along the extended optical trap.

19. The method as defined in claim 1 wherein the commercial use includes at least a step of assembling functionalized particles for probing properties and manipulating particles for manufacturing a product.

20. A system for establishing extended optical traps for processing materials, comprising:
   a light source to provide a light beam;
   a diffractive optical element to process the light beam, the diffractive optical element including phase information and amplitude information to create an extended optical trap; and
   an optical train to project the light beam processed by the diffractive optical element and to carry out the processing of materials.

21. The system as defined in claim 20 wherein the light source comprises a laser source.

22. The system as defined in claim 20 wherein the phase information comprises a preprogrammed phase function for creating a prescribed optical force along the extended optical trap.

23. The system as defined in claim 22 wherein the preprogrammed phase function creates an assembly line for nanomanufacture of product.

24. The system as defined in claim 22 wherein the phase information and amplitude information comprise at least one of a displacing phase function, a function creating a three dimensional shaped extended optical trap configuration and a phase function allowing assigned and unassigned light pixels to be programmably arranged.

* * * * *